(12) United States Patent
Whitsitt (10) Patent No.: US 7,866,982 B1
(45) Date of Patent: Jan. 11, 2011

(54) AIRCRAFT CROSSWIND LANDING SIMULATOR

(76) Inventor: Bradley J. Whitsitt, 6714 Sundown South Dr., Indianapolis, IN (US) 46254

(*) Notice: Subject to any disclaimer, the term of this patent is extended or adjusted under 35 U.S.C. 154(b) by 937 days.

(21) Appl. No.: 11/736,654

(22) Filed: Apr. 18, 2007

Related U.S. Application Data (60) Provisional application No. 60/793,005, filed on Apr. 18, 2006.

(51) Int. Cl.
*G09B 9/00* (2006.01)

(52) U.S. Cl. .................................................. 434/28

(58) Field of Classification Search ............ 434/28–30, 434/33, 35, 46, 49, 51, 55, 58
See application file for complete search history.

(56) References Cited

U.S. PATENT DOCUMENTS

| | | | | |
|---|---|---|---|---|
| 2,452,039 | A | * | 10/1948 | Crane ........................... 434/28 |
| 2,494,508 | A | * | 1/1950 | Dehmel ........................ 434/28 |
| 2,930,144 | A | | 3/1960 | Fogarty |
| 4,019,261 | A | * | 4/1977 | Pancoe ......................... 434/58 |
| 4,355,982 | A | | 10/1982 | James |
| 4,601,663 | A | | 7/1986 | Allison et al. |
| 4,710,128 | A | | 12/1987 | Wachsmuth et al. |
| 4,887,967 | A | | 12/1989 | Letovsky et al. |
| 5,431,569 | A | * | 7/1995 | Simpkins et al. ............. 434/29 |
| 5,453,011 | A | | 9/1995 | Feuer et al. |
| 5,685,718 | A | * | 11/1997 | McClintic ..................... 434/38 |
| 5,860,807 | A | * | 1/1999 | McFarland et al. ........... 434/33 |
| 5,866,813 | A | * | 2/1999 | Nakaya et al. ................ 73/147 |
| 5,885,080 | A | | 3/1999 | Letovsky |
| 6,431,872 | B1 | * | 8/2002 | Shiraishi et al. ............. 434/69 |
| 6,813,595 | B2 | | 11/2004 | Edgar |
| 6,902,402 | B2 | | 6/2005 | McClintic |
| 2003/0219701 | A1 | * | 11/2003 | Zeier ........................... 434/33 |
| 2004/0029081 | A1 | | 2/2004 | Jaros et al. |

* cited by examiner

*Primary Examiner*—Kurt Fernstrom
(74) *Attorney, Agent, or Firm*—William F. Bahret (57) ABSTRACT

An aircraft crosswind training simulator has a fixed-pitch cockpit rotatably mounted atop a platform. Rotation of the cockpit is controlled by motor controllers that are responsive to movement of the cockpit's steering control. A rotation sensor detects rotation of the cockpit and communicates with a motor controller that controls the direction and speed of a motor mounted to the platform. The motor is engaged with a drive wheel that drives the platform laterally across the floor in response to rotation of the cockpit that is detected by the rotation sensor. An instructor input switch manipulates the motor controllers to introduce additional forces to the rotation of the cockpit and/or additional forces to the lateral movement of the platform, simulating external forces present during crosswind conditions.

14 Claims, 7 Drawing Sheets

AIRCRAFT CROSSWIND LANDING SIMULATOR

CROSS-REFERENCE TO RELATED APPLICATION

This application claims the benefit of U.S. Provisional Patent Application Ser. No. 60/793,005, filed Apr. 18, 2006, which application is hereby incorporated by reference.

TECHNICAL FIELD OF THE INVENTION

The present invention relates generally to aviation and, more particularly, to aircraft training simulators.

BACKGROUND OF THE INVENTION

Landing aircraft during crosswind weather conditions is one of the most demanding flight maneuvers in aviation flight, and is often difficult to learn due to the unique and assertive use of flight controls needed to be successful and safe during such landings. The National Transportation Safety Board (NTSB) cites crosswinds and gusts as the top two causes of weather related aircraft accidents, and about 90% of these accidents occur at wind speeds well below aircraft capability. This suggests that pilot skill is the primary shortfall. Despite the relatively high risk of accident during such maneuvers, many general aviation pilots receive limited training time in practicing landing aircraft during crosswind landing conditions, and as a result, often avoid attempting the maneuver, leading to degraded skills and increased apprehension that causes some to stop piloting altogether.

To provide meaningful crosswind landing training to pilots, aircraft training simulators should ideally duplicate conditions present in aircraft just prior to touchdown on the runway, such as forces exerted on the pilot's body, partially obstructed view of the runway, and peripheral vision cues necessary to make a proper landing. Most aircraft training simulators available at local airports, however, are stationary computer-based simulators that don't duplicate these conditions and are of little value for crosswind landing training. A few high-end computer-based training simulators do provide adequate crosswind landing conditions simulation, but do so with visual cues by moving images displayed on the simulator's computer screen to replicate conditions.

SUMMARY OF THE INVENTION

One aspect of the present invention involves providing an aircraft crosswind training simulator for teaching pilots to pilot and land aircraft during crosswind conditions. The aircraft crosswind training simulator has a fixed-pitch cockpit rotatably mounted atop a platform. Rotation of the cockpit is controlled by motor controllers that are responsive to movement of the cockpit's steering control. A rotation sensor detects rotation of the cockpit and communicates with a motor controller that controls the direction and speed of a motor mounted to the platform. The motor is engaged with a drive wheel that drives the platform laterally across the floor in response to rotation of the cockpit that is detected by the rotation sensor. An instructor input switch manipulates the motor controllers to introduce additional forces to the rotation of the cockpit and/or additional forces to the lateral movement of the platform, simulating external forces present during crosswind conditions.

The objects and advantages of the present invention will be more apparent upon reading the following detailed description in conjunction with the accompanying drawings.

DETAILED DESCRIPTION OF THE PREFERRED EMBODIMENT

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

One aspect of the present invention involves providing an aircraft crosswind training simulator 1 (FIG. 1) for teaching pilots to pilot and land aircraft during crosswind conditions that duplicates conditions present in an aircraft just prior to touching down on a runway.

Figure 1:
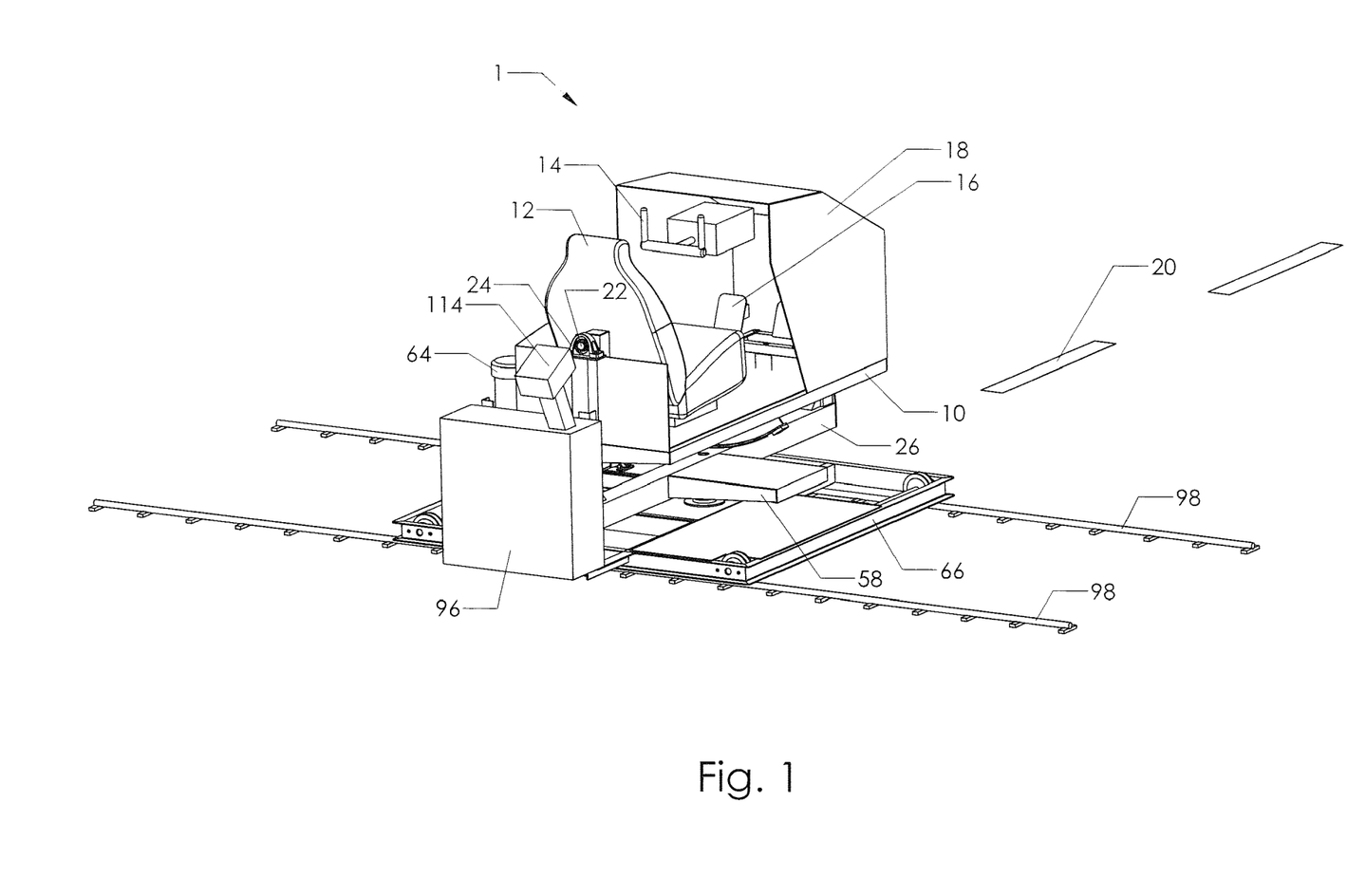
FIG. 1 shows the preferred embodiment of an aircraft crosswind training simulator according to one aspect of the present invention.

Referencing FIG. 1, the cockpit 10 of the simulator is designed to emulate the flight deck of a standard light aircraft. It supports seat 12 in which a student pilot is secured via a seat belt system. The student is seated in front of steering control yoke 14 and rudder pedals 16 which are situated for access similar to a standard light aircraft. The cockpit cowling 18 restricts the student's visual field and provides visual feedback similar to the cockpit of an actual airplane. While looking over the cowling 18, the student sees a replicated aircraft runway centerline 20 on the floor in front of the cockpit. The combination of the centerline 20 and cowling 18 provide the primary visual feedback similar to that found in an actual airplane.

At the front and rear of cockpit 10, roll pins 22 (FIGS. 1, 3, and 4) rest in roll bearings 24 that are attached to yaw fork 26 (FIGS. 2 and 4), which fixes the pitch axis of the cockpit. Roll pins 22 provide the longitudinal axis (roll axis) about which cockpit 10 rolls when roll rotation of the cockpit it initiated.

The cockpit 10 is rolled left and right about its roll axis via force applied by roll motor 28 (FIGS. 2 and 6) through the roll drivetrain. Roll motor 28 is preferably a reversing, variable speed ½ horsepower three-phase AC electric motor (synchronous or stepper-type, for example) with a combined gearbox that achieves the speed reduction necessary to provide acceptable low and high speed roll rotation rates by utilizing minimum and maximum drive frequencies of about 5 Hz to 90 Hz. Roll motor 28 is preferably controlled by a motor controller (control means)(not shown), such as an adjustable-speed drive (preferably a variable-frequency drive (VFD) type adjustable-speed drive), that determines the phasing and frequency of the power to the motor in order to control its direction and speed.

Figure 2:
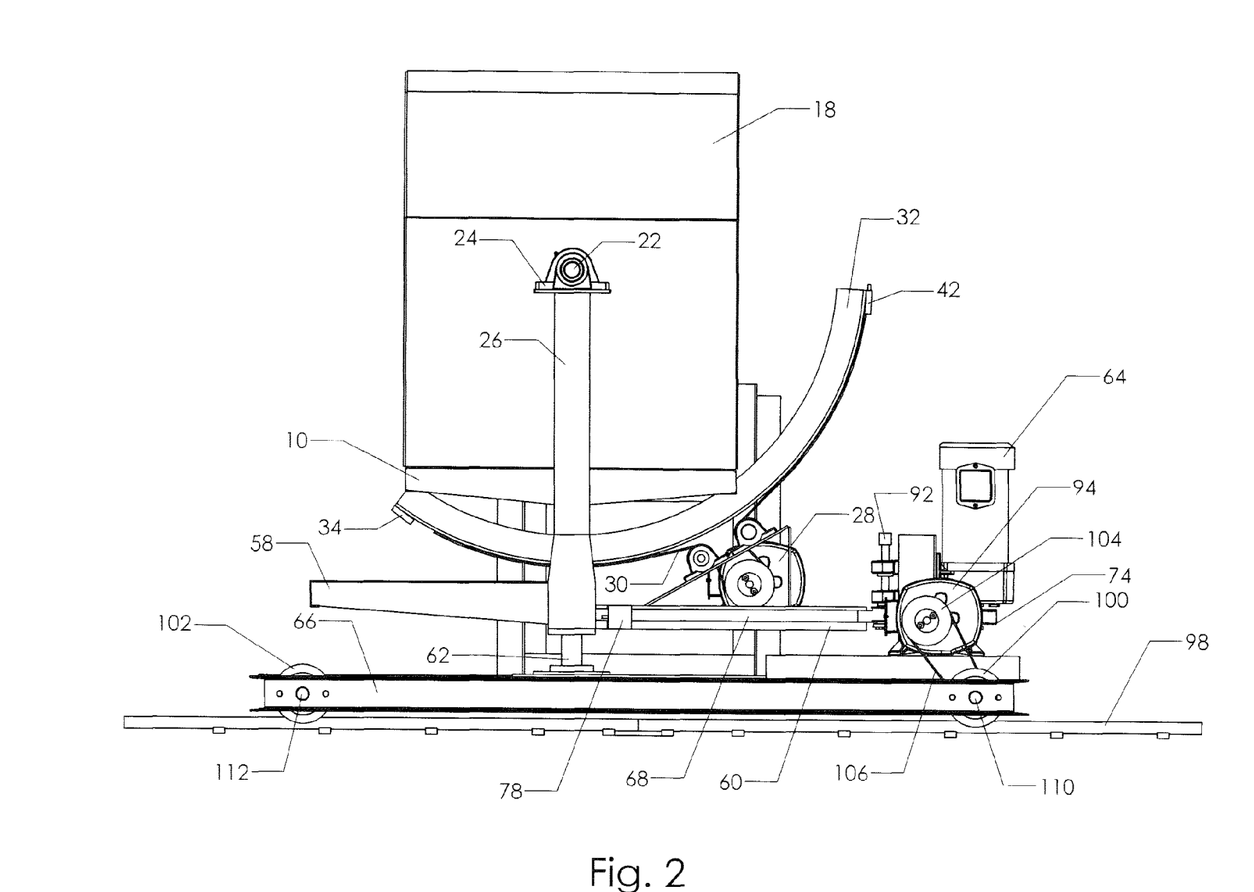
FIG. 2 is a front end view of the aircraft crosswind training simulator of FIG. 1.
Figure 3:
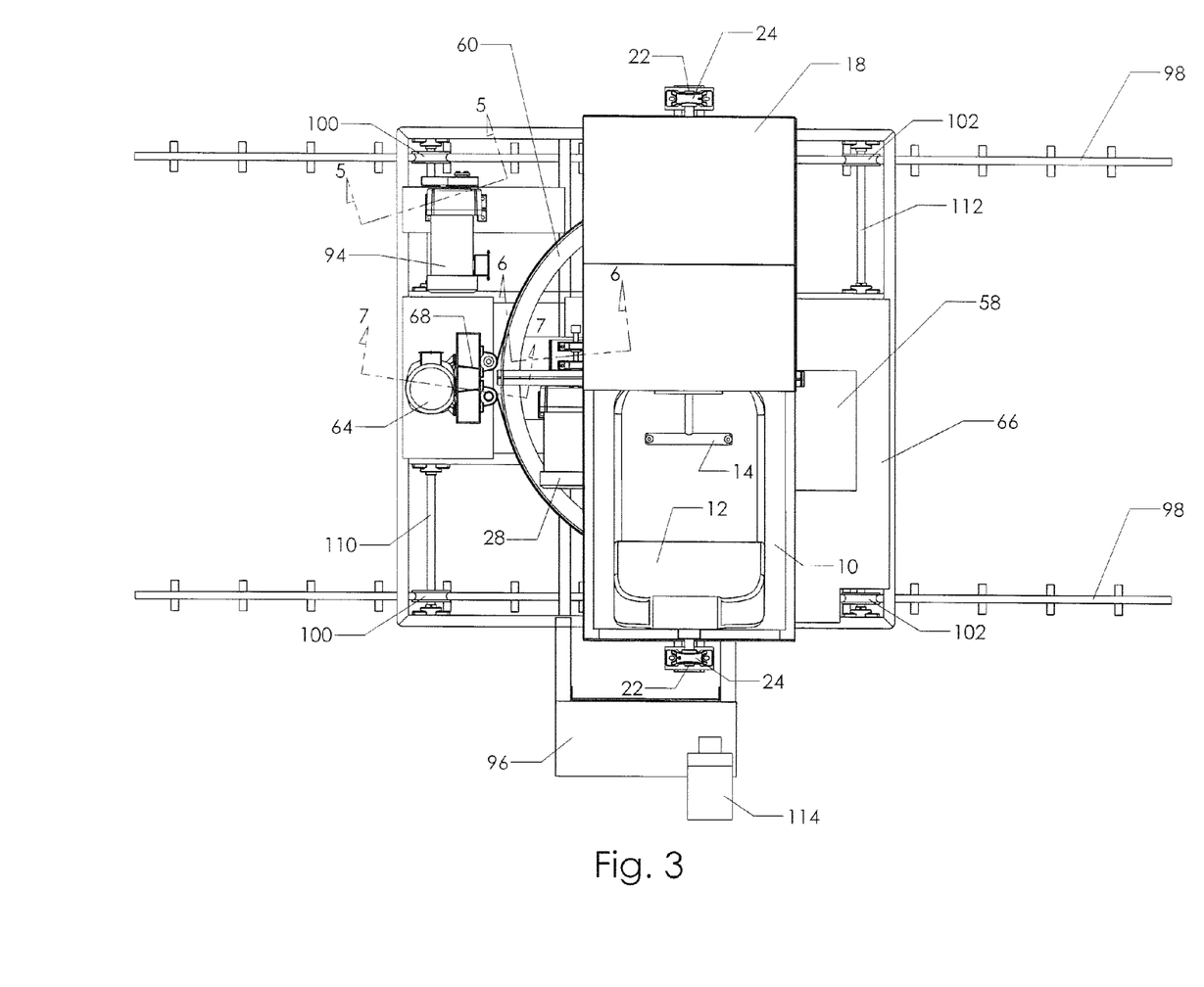
FIG. 3 is an overhead view of the aircraft crosswind training simulator of FIG. 1.
Figure 6:
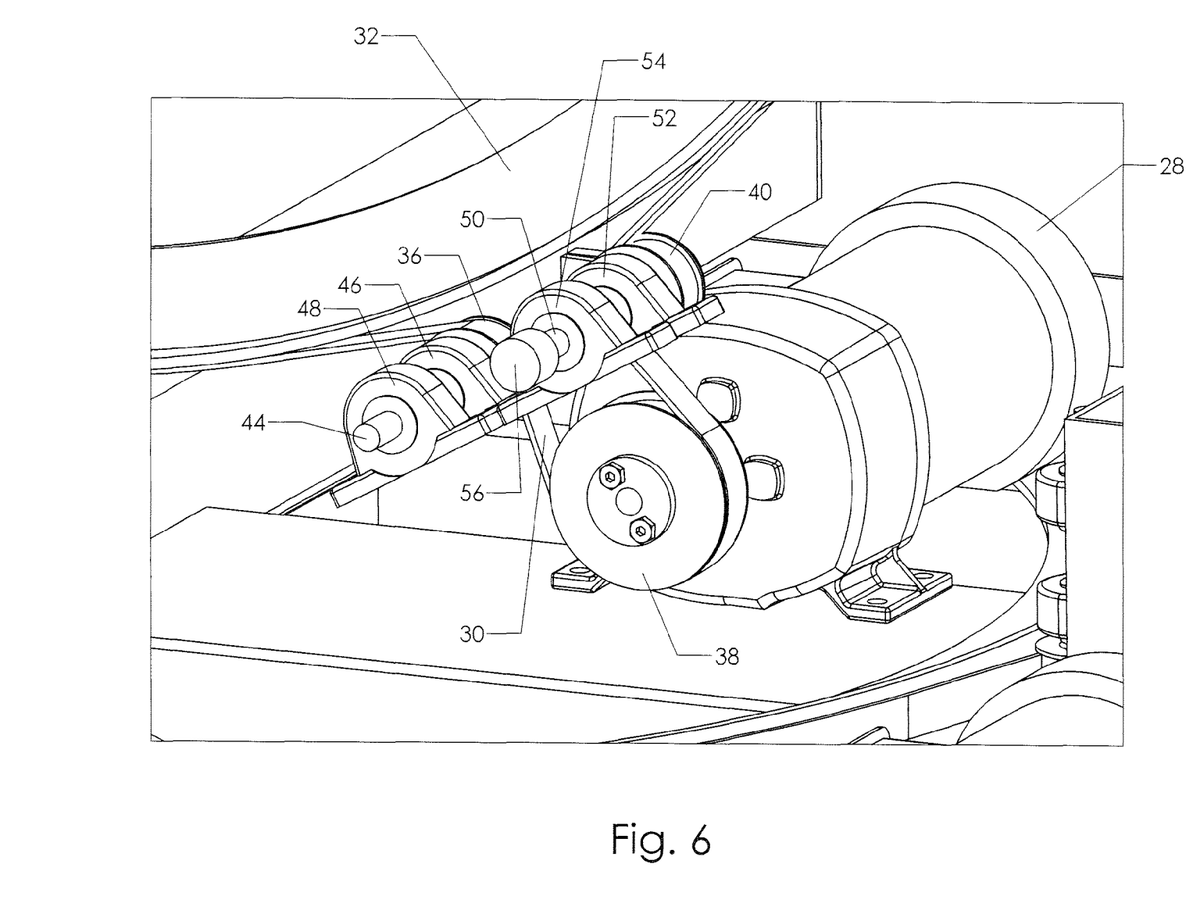
FIG. 6 shows detail of the roll motor drivetrain of the aircraft crosswind training simulator of FIG. 1.

The on-board computer (not shown) calculates the desired roll motor speed and direction and then preferably provides an appropriate 0 to 10 VDC analog signal to the controller to indicate motor speed and direction in one signal. For example, a control scheme may comprise sending a 5VDC signal to the controller when a cockpit roll rotation speed of zero is desired, stopping motor 28. 0 and 10 VDC signals, respectively, may then indicate desired cockpit rotation in opposite directions at maximum speeds, while in between values may represent linear changes in speed. Roll motor speed and direction is computed by algorithms that process information such as yoke position, rudder position, induced roll, and introduced wind condition forces, to produce desired effects that duplicate conditions in a light aircraft near landing speed with a pilot at the controls.

Roll motor 28 is attached to yaw fork 26, and adjusts the cockpit roll rotation angle via the roll belt 30 and roll radius 32. Roll belt 30 is a double sided synchronous belt affixed to the roll radius on one end through roll belt clamp 34. Roll belt 30 rides the face of the roll radius 32 until it reaches roll guide pulley 36, where it is directed around roll motor drive pulley 38 and back to opposing roll guide pulley 40. Roll belt 30 again joins the roll radius 32 and terminates at roll belt tension clamp 42. Roll belt tension clamp 42 can be adjusted to maintain correct belt tension on all roll drivetrain components.

Roll guide pulley 36 is supported by roll guide pulley shaft 44 (FIG. 6), which is supported by roll guide bearings 46 and 48. Opposing roll guide pulley 40 is supported by opposing roll guide pulley shaft 50, which is supported by opposing roll guide bearings 52 and 54. Roll guide pulleys 36 and 40 route roll belt 30 to roll motor drive pulley 38 and force roll belt 30 against roll radius 32. Roll guide pulley shaft 50 also drives rotation sensor 56, providing roll position input to the computer. Rotational movement of cockpit 10 is restricted by limit switches (not shown) through the computer controls and by way of mechanical stops (not shown) in case of control system failure. Rotation sensor 56 is generally a means for sensing rotation of the cockpit about its roll axis. The rotation sensor shown in the figures is a multi-turn potentiometer, but other rotary transformers (reslovers, rotary encoders, synchros) may also be used.

Yaw fork 26 (FIGS. 2 and 4) supports cockpit 10, roll motor 28, step 58 and yaw radius 60. Yaw radius 60 is similar to the roll drive radius 32 previously described. Yaw fork 26 is supported entirely on yaw bearing 62 (FIG. 2) which allows yaw fork 26, and thus cockpit 10, to rotate about its vertical (yaw) axis. Its rotation is limited by limit switches (not shown) and by mechanical stops (not shown), in case of a control system failure.

Figure 4:
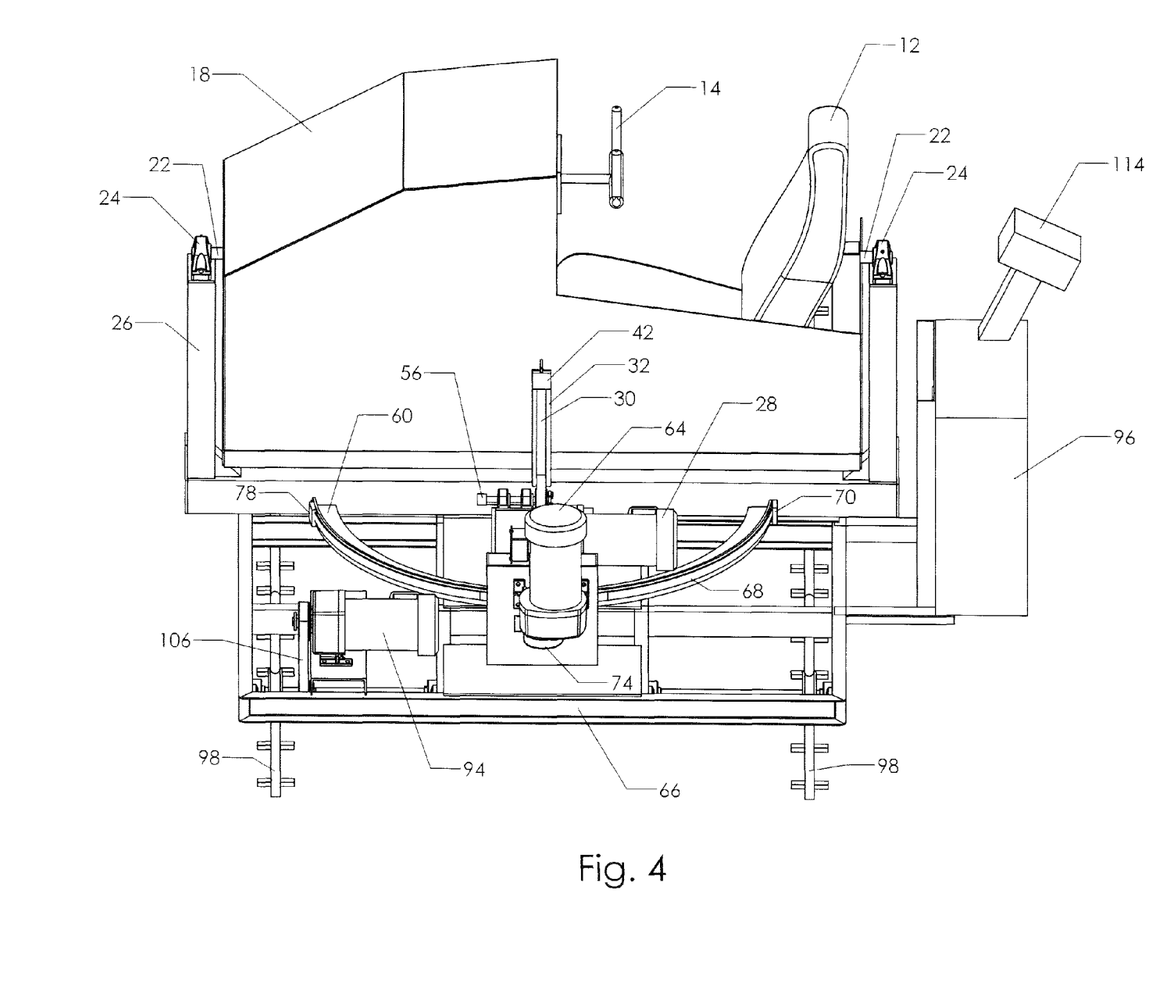
FIG. 4 is a left side view of the aircraft crosswind training simulator of FIG. 1.
Figure 7:
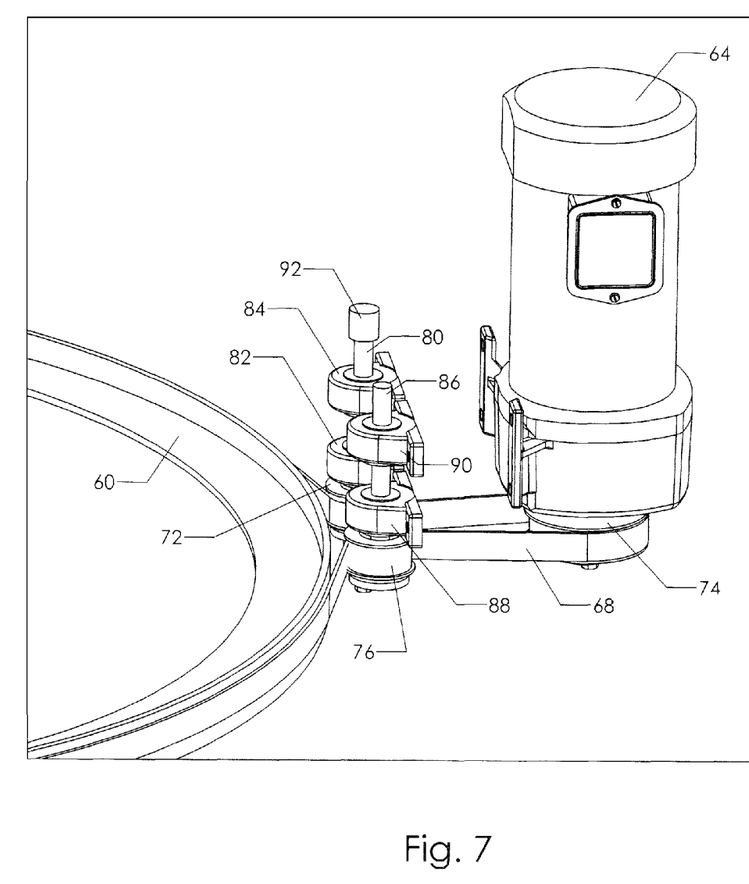
FIG. 7 shows detail of the yaw motor drivetrain of the aircraft crosswind training simulator of FIG. 1.

Referencing FIGS. 4 and 7, yaw fork 26 rotates left and right via force applied by yaw motor 64 through the yaw drivetrain. Yaw motor 64 is preferably a reversing, variable speed ½ horsepower three-phase AC electric motor, similar to the roll motor described above. Yaw motor 64 is preferably controlled by a motor controller (not shown), such as a VFD, that determines the phasing and frequency of the power to the motor in order to control its direction and speed.

The on-board computer calculates the desired yaw motor speed and direction and then preferably provides an appropriate signal to the controller to control it in a manner similar to the roll motor control scheme example described above. Yaw motor speed and direction is computed by algorithms that process information such as yoke position, rudder position, adverse yaw, and introduced wind condition forces, to produce desired effects that duplicate conditions in a light aircraft near landing speed with a pilot at the controls.

Yaw motor 64 is attached to platform 66, and adjusts the yaw rotation angle of the cockpit via the yaw belt 68 and yaw radius 60. Yaw belt 68 is a double sided synchronous belt affixed to yaw radius 60 on one end through yaw belt clamp 70. The yaw belt 68 rides the face of yaw radius 60 until it reaches yaw guide pulley 72 where it is directed around yaw motor drive pulley 74 and back to opposing yaw guide pulley 76. Yaw belt 68 again joins yaw radius 60 and terminates at yaw belt tension clamp 78. Yaw belt tension clamp 78 can be adjusted to maintain the correct belt tension on all yaw drivetrain components.

Yaw guide pulley 72 is supported by yaw guide pulley shaft 80, which is supported by yaw guide bearings 82 and 84. Opposing yaw guide pulley 76 is supported by opposing yaw guide pulley shaft 86, which is supported by opposing yaw guide bearings 88 and 90.

Yaw guide pulley 72 and opposing yaw guide pulley 76 serve to route yaw belt 68 to yaw motor drive pulley 74, and forces yaw belt 68 close to yaw radius 60. Yaw guide pulley shaft 80 also drives yaw sensor 92, providing yaw position input to the computer. Yaw sensor 92 is shown as a multi-turn potentiometer, but other rotation sensors may also be used as previously mentioned.

Platform motor 94 (FIG. 2) traverses platform 66 (and thus cockpit 10 and control panel 96) left and right along track 98 through drive wheels 100 and idler wheels 102. Platform motor 94 drives drive wheels 100 through the platform drivetrain (FIG. 5) which includes motor pulley 104, drive belt 106, drive shaft pulley 108, and drive shaft 110. The platform motor is preferably a reversing, variable speed ½ horsepower three-phase AC electric motor, similar to the roll and yaw motors previously described. Platform motor 94 is preferably controlled by a motor controller (not shown), such as a VFD, that determines the phasing and frequency of the power to the motor in order to control its direction and speed.

Figure 5:
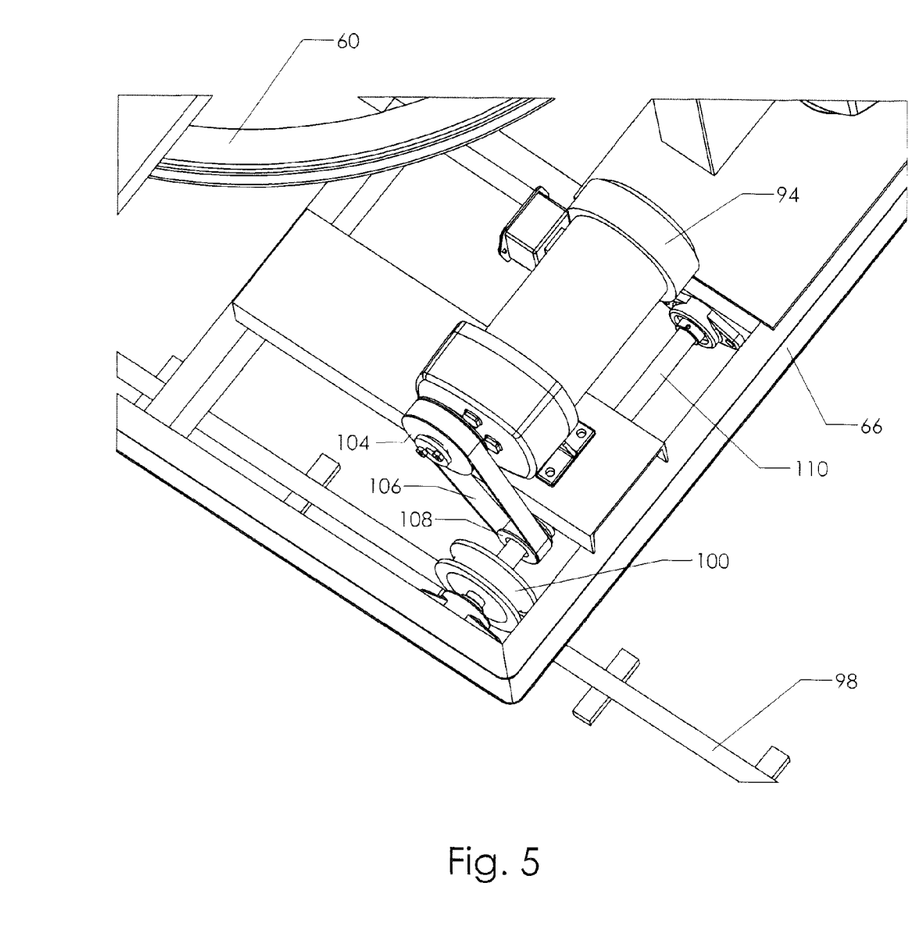
FIG. 5 shows detail of the front left corner of the aircraft crosswind training simulator of FIG. 1.

The on-board computer calculates the desired platform motor speed and direction and then preferably provides an appropriate signal to the controller to control it in a manner similar to the roll motor control scheme example described above. The speed and direction of the platform motor is computed by algorithms that process information such as roll position, yaw position, and introduced wind condition forces, to produce desired effects that duplicate conditions in a light aircraft near landing speed with a pilot at the controls.

The control panel 96 (FIG. 1) is preferably attached to the back side of platform 66, and contains the computer (not shown), power supply (not shown), and motor controllers (not shown) that control the roll, yaw, and platform motors. Instructor control station 114 is attached to the control panel 96 in such a way that a flight instructor can stand behind the entire simulator and adjust all parameters in real time. Instructor control station 114 preferably offers the following controls: Power, E-Stop, Yaw jog, Roll jog, Drift jog, Center All, run/stop, wind direction and speed, and wind gust (collectively, input switches).

In general, the computer receives position information from the yoke 14, rudder pedals 16, roll sensor 56 and yaw sensor 92, as well as control information from the instructor control station 114 input switches (including wind speed, wind direction and gust magnitude), and processes them to determine movement of the simulator.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An aircraft crosswind training simulator, comprising:
    a fixed-pitch cockpit;
    a drive wheel engaged with said cockpit, said drive wheel rotatable about an axis substantially parallel with the roll axis of said cockpit;
    means for sensing rotation of said cockpit about its roll and yaw axes; and
    a controller in communication with said drive wheel and responsive to said sensing means.

2. The aircraft crosswind training simulator of claim 1, further comprising:
    a steering control;
    a roll motor controller responsive to said steering control, controlling rotation of said cockpit about the roll axis of said cockpit; and
    a yaw motor controller responsive to said steering control, controlling rotation of said cockpit about the yaw axis of said cockpit.

3. The aircraft crosswind training simulator of claim 2, further comprising an input switch, wherein one of said roll and yaw motor controllers is further responsive to said input switch.

4. The aircraft crosswind training simulator of claim 1, wherein said sensing means comprises:
    a rotary transformer to detect rotation of said cockpit about its roll axis; and
    a rotary transformer to detect rotation of said cockpit about its yaw axis.

5. The aircraft crosswind training simulator of claim 4, further comprising:
    a platform disposed beneath said cockpit;
    a rotary bearing fixed to said platform, said cockpit mounted to said rotary bearing along said cockpit's yaw axis; and
    a drive shaft substantially parallel with the longitudinal axis of said platform, said drive wheel driven by said drive shaft.

6. The aircraft crosswind training simulator of claim 5, further comprising a platform motor mounted to said platform and engaged with said drive shaft, said platform motor responsive to said controller.

7. The aircraft crosswind training simulator of claim 6, further comprising a steering control, said controller responsive to said steering control.

8. The aircraft crosswind training simulator of claim 7, further comprising means for controlling rotation of said cockpit about its roll and yaw axes, said control means responsive to said steering control.

9. The aircraft crosswind training simulator of claim 8, further comprising an input switch, said control means responsive to said input switch.

10. The aircraft crosswind training simulator of claim 7, further comprising:
    a roll motor controller mounted on said platform and responsive to said steering control;
    a roll motor mounted on said platform, engaged with said cockpit, and responsive to said roll motor controller;
    a yaw motor controller mounted on said platform and responsive to said steering control; and
    a yaw motor mounted on said platform, engaged with said cockpit, and responsive to said yaw motor controller.

11. An aircraft crosswind training simulator, comprising:
    a platform;
    a fixed-pitch cockpit, said cockpit rotatably mounted atop said platform;
    a motor mounted to said platform, said motor responsive to rotation of said cockpit; and
    a drive wheel engaged with said motor to drive said platform laterally across a surface during use.

12. The aircraft crosswind training simulator of claim 11, further comprising:
    a rotation sensor to detect rotation of said cockpit; and
    a motor controller in communication with said motor and said rotation sensor,
    wherein said motor is responsive to rotation of said cockpit through said rotation sensor and said motor controller.

13. The aircraft crosswind training simulator of claim 12, wherein said rotation sensor comprises a rotary transformer.

14. The aircraft crosswind training simulator of claim 12, wherein said motor controller is mounted to said platform.

\* \* \* \* \*